United States Patent

Quay

[15] 3,668,618

[45] June 6, 1972

[54] IDENTIFICATION AND CLASSIFICATION OF SEISMIC REFLECTION VELOCITY PROPERTIES ON SEISMIC REFLECTION SECTIONS

[72] Inventor: Roy G. Quay, San Antonio, Tex.

[73] Assignee: Petty Geophysical Engineering Company, San Antonio, Tex.

[22] Filed: Jan. 5, 1970

[21] Appl. No.: 778

[52] U.S. Cl. ............340/15.5 DS, 340/15.5 R, 340/15.5 DP
[51] Int. Cl. ..........................................................G01v 1/00
[58] Field of Search............................................340/15.5 DP

[56] References Cited

UNITED STATES PATENTS 2,309,817  2/1943  Athy et al. ............................340/15.5

OTHER PUBLICATIONS

Seismic Velocities in the Southeastern San Joaquin Valley of Calif. Geophysics, Vol. VI, No. 4, pg. 327–55

Geophysics, Vol 3, Oct. 1938, ppgs. 295– 305, Velocity Determination by Means of Reflection Profiles, C. H. Green Geophysics, Vol. 30, Apr. 1965, ppgs. 1141– 1143, Conversion of Electric Logs for Seismic Time Sections, L. F. Ivanhoe Primary Examiner—Malcolm F. Hubler
Assistant Examiner—H. A. Birmiel
Attorney—Arnold, White & Durkee, Frank S. Vaden, III, Paul Van Slyke and Tom Arnold

[57] ABSTRACT

Velocity information is superimposed on a conventional seismic reflection section using either a transparent overlay or an optical projection. Isodepth lines are used for conventional reflection time sections and iso-time lines are used for reflection depth sections. The isodepth lines could be in the order of every 1000 feet but would depend on the time scale used on the reflection time section. Iso-time lines spaced ten milliseconds apart could be appropriate for a long depth scale and fewer lines could be used for a smaller scale.

The change in spacing between these lines for specific reflections denotes a change in the interval velocity, hence stratigraphic changes which can be used to locate stratigraphic traps for minerals. The isodepth lines also permit conversion of seismic reflections on a reflection time section to depth lines. Iso-time lines convert data on a reflection depth section to a time scale.

Either isodepth lines or iso-time lines can be used to identify changes in interval velocities for specific zones of interest, to determine the average vertical velocity to selected reflections, and to show where velocity anomalies exist.

7 Claims, 7 Drawing Figures

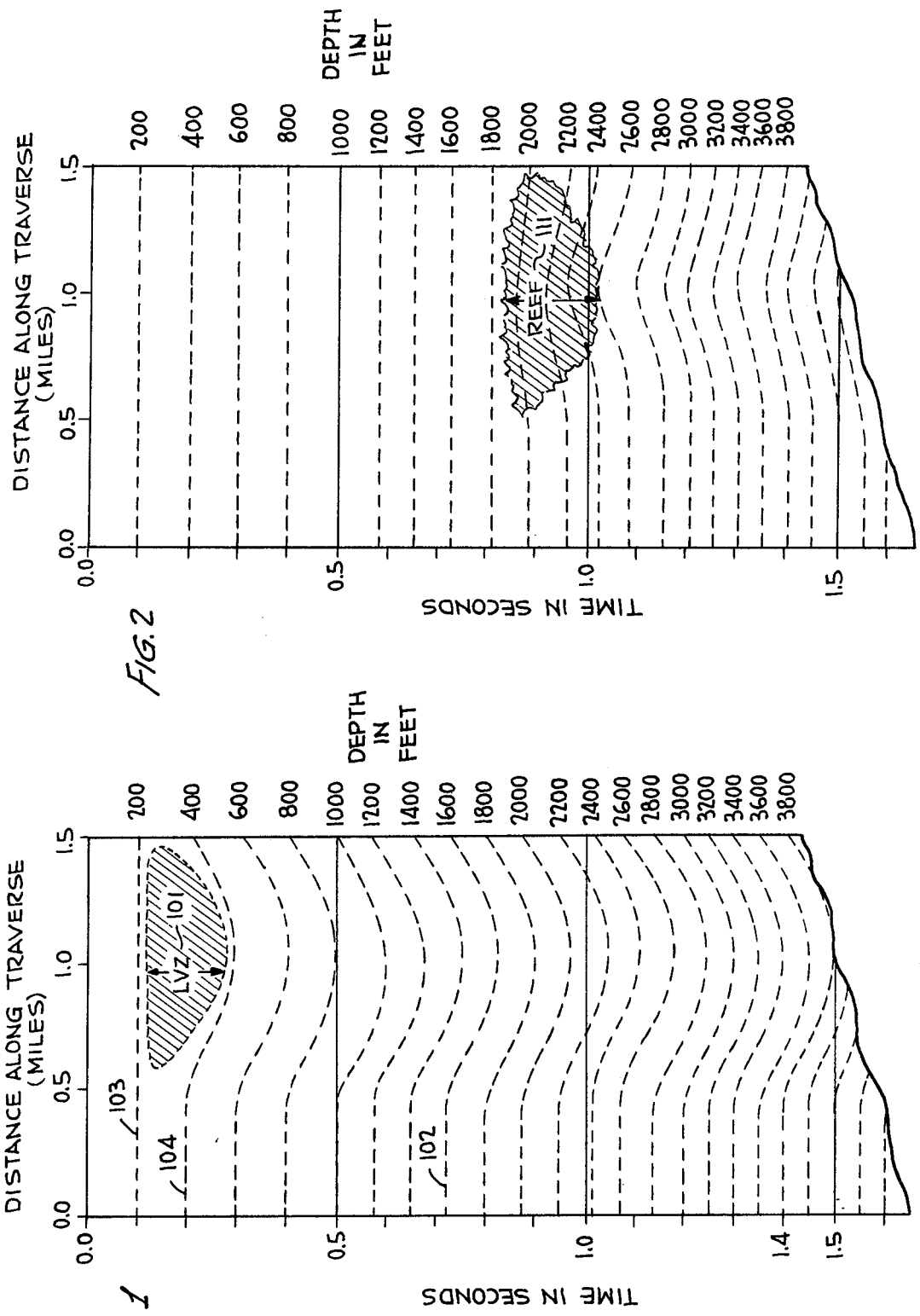

PATENTED JUN 6 1972 3,668,618

INVENTOR,
ROY G. QUAY
BY Watson, Cole, Grindle & Watson
ATTORNEYS

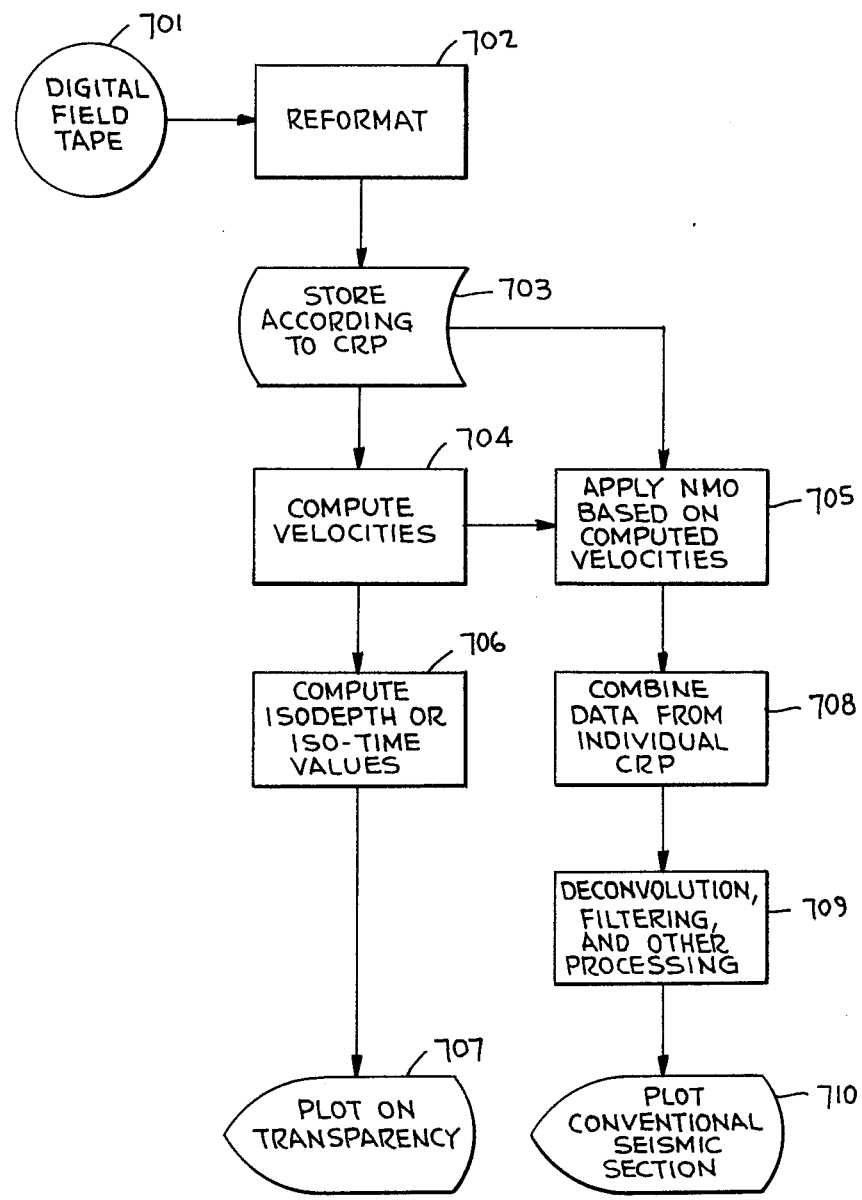

3,668,618

IDENTIFICATION AND CLASSIFICATION OF SEISMIC REFLECTION VELOCITY PROPERTIES ON SEISMIC REFLECTION SECTIONS

BACKGROUND OF THE INVENTION

1. Field of the Invention

This invention is in the field of seismic reflection exploration such as for minerals including oil. In particular, the invention presents the seismic data in order that anomalous velocity conditions in the ground can be recognized and interpreted for those conditions favorable to the accumulation of minerals. This invention includes the method of and the means for data processing of the seismic data and the presentation of seismic data for the interpretation of geologic conditions.

2. Description of the Prior Art

It is well known to those skilled in the art the method of representing seismic reflection sections or profiles along a given traverse. Seismic signals are processed in a digital computer to improve the signal-to-noise ratio and the resulting displays show the amplitude variations of the data as a linear function of vertical travel time for a reflection point (represented by a trace on the section). Similar amplitude variations of the data from the adjacent reflection points are placed adjacent to the first trace to form an indication of the geologic formations along the traverse. Similar sections have been made to represent reflection points as a linear function of depth. Seismic signals from a common reflection point are often obtained using different source-to-detector distances for the horizontal stacking method of Mayne. These signals have been analyzed for velocity as described in U.S. Pat. application of Hollingsworth Ser. No. 857,605 filed Sept. 12, 1969 and assigned to the same assignee as the present application. The analysis was made as described in the Hollingsworth application to introduce corrections for normal moveout during the processing of the data, but were not displayed in a continuous manner in order that the data could be correlated with the particular seismic reflections on the seismic sections, nor could the depth of the reflecting horizon be readily observed.

In the past, the usual velocity display was a calcomp plotter graph of velocity vs time at one common reflection point. In this manner the velocity can be displayed for only a few record times without the response lines crossing each other in a maze. It is only computed for isolated common reflection points and not interpolated for intermediate common reflection points.

SUMMARY OF THE INVENTION

In the present invention, the object is to display the information previously computed in such a manner that local and regional variations of interval velocities are readily apparent and their direct relation with the seismic sections is also apparent. Other sources of velocity information, such as continuous velocity logs in deep wells, may be used.

The result of this presentation is an indication of the interval velocity by the spacing between the lines. The local and regional changes in interval velocity can be readily correlated with the reflections due to the super-positioning of both local and regional data. It is preferable that distinct colors be used for the overlay or projection. This display permits determining the location of stratigraphic traps which are the controlling factor in most of the oil being located at present. The previous methods of visual displays have been so effective in locating major oil bearing structures that most of these in the United States have been located. However, these displays do not include any interval velocity indication needed to find other types of oil traps or non-structural mineral accumulations.

Each isodepth line (displayed on a reflection time section) indicates the differences in reflection time along the traverse from a horizontal reflecting boundary. These differences in reflection time are caused by actual velocity changes in the ground along the traverse. The placing of the isodepth lines over the reflection time section indicates the time difference between a horizontal reflecting boundary and the actual boundary, hence it is easy to determine the direction of dip of the actual boundary.

Each iso-time line (displayed on a reflection time section) indicates the depth at which the reflection has occurred. It shows the effects of velocity changes along the traverse.

BRIEF DESCRIPTION OF THE DRAWINGS

FIG. 1 illustrates an isodepth display which may be an overlay for a projection onto a conventional seismic reflection time section. The effect of an extremely low velocity zone (LVZ) is illustrated on this isodepth display by the wider spacing between the isodepth lines.

FIG. 2 is similar to FIG. 1 except a high velocity media, such as a reef, is present at a depth greater than the low velocity zone. Isodepth lines closer together indicates the presence of a high velocity medium under station 1.0 mile at about 2,000 feet deep.

FIG. 4 illustrates that this low velocity zone has made the data appear as if a structural high existed at station 0.5 mile in the deeper horizons even though this high does not exist in reality.

FIG. 7 illustrates a flow chart for one form of the invention.

DESCRIPTION OF THE PREFERRED EMBODIMENTS

Figure 4:
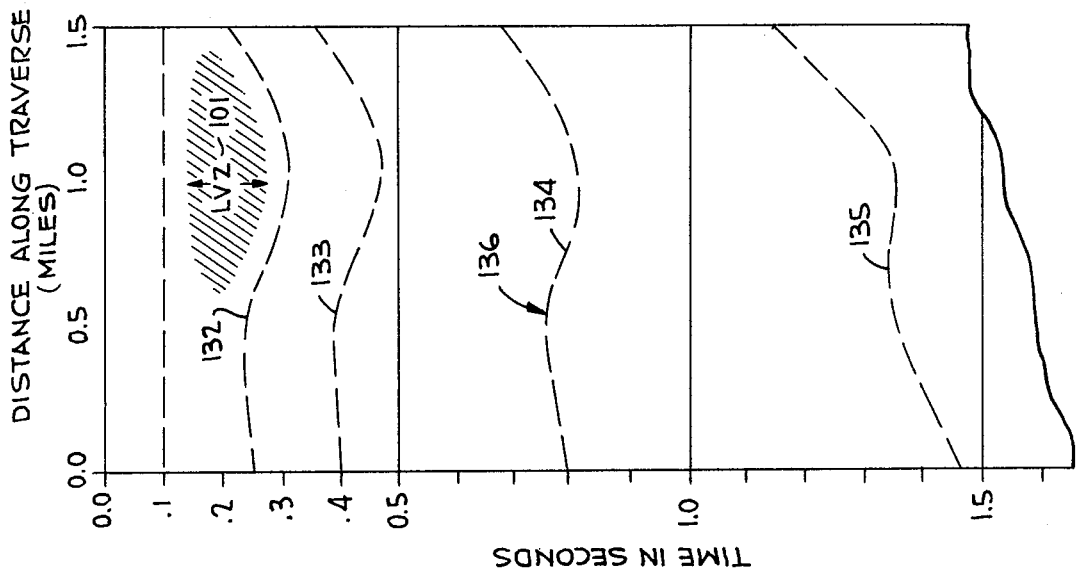
FIG. 4 is the same as FIG. 3 except the low velocity layer in FIG. 1 has been introduced at station 1.0 mile.

FIG. 1 illustrates an isodepth display. This complete display could be printed on transparent film using the same time scale and horizontal distance (along the traverse) as used for the conventional seismic reflection time section. Preferably both the dashed lines and the remaining isodepth display would be a different color than the conventional seismic reflection time section. This transparency would be placed over the conventional section with time and distance scales aligned.

The velocity to any specified depth is uniform from station 0.0 out to 0.5 miles as evidenced by the horizontal dashed lines out to 0.5 miles. The velocity is low for the initial 0.5 seconds of the record increases during the remainder of the time. The average vertical velocity to any reflector can be determined from this display. For example, at a two-way travel time of 0.5 seconds, the depth is 1,000 feet, or the two-way distance (2,000 feet), divided by the two-way time (0.5 second) indicates an average velocity of 4,000 feet per second. This lower than normal velocity simplifies the illustration.

The interval velocity can be determined using the time and spacing between the dashed lines. For example, the difference in time from 1.4 to 1.5 seconds (two-way time) results in a 400-foot depth-differential (one-way travel distance) or in an interval velocity of 8,000 feet per second (800 0.1 = 8,000).

A low velocity zone 101 extends from station 0.5 to station 1.5 miles along the traverse at a depth of about 200 feet and extends downward an additional 200 feet near station 1.0 mile. The interval velocity in the low velocity zone 101 can be determined from the two-way travel distance (400 feet) divided by the two-way travel time (0.2 second) or 2,000 feet per second. This is probably an ancient river channel filled with debris with gas bubbles in water. This contrast is larger than usual, but it illustrates the use of the isodepth section. It should be noted that all of the dashed lines below the 400-foot level are similar to the 400-foot line. This is based on uniform interval velocities along the entire traverse with the exception of the LVZ 101.

FIG. 2 illustrates a high velocity zone such as reef 111. This display is the same as FIG. 1 except the reef 111 is present instead of the LVZ 101. The interval velocity at any specific depth down to 1,800 feet deep is constant along the traverse so the dashed isodepth lines are parallel down to and including 1,800 feet. Since the high velocity reef 111 extends from station 0.5 out to station 1.5 and below 1,900 feet in depth, the dashed lines are closer together when the reef is in the zone between the dashed lines. The greater the thickness of the reef, the greater the deviation of the dashed lines. Below the reef, the dashed lines have the same deflection as the 2,600-foot isodepth line at the bottom of the reef.

Figure 3:
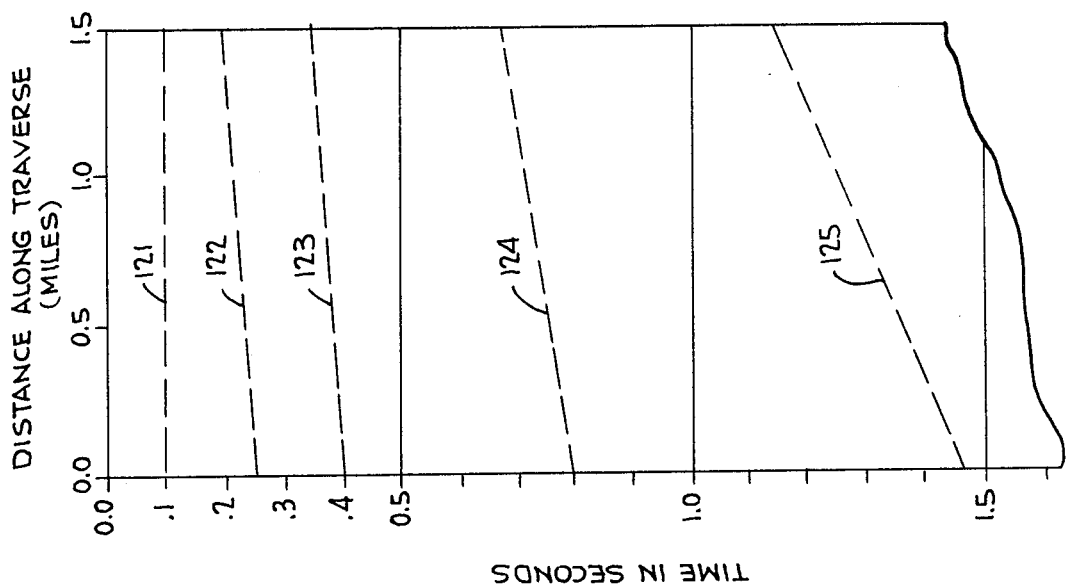
FIG. 3 illustrates the times when typical reflections may be received. The conventional seismic section would have an amplitude characteristic of reflections which occurred at these times. No change in velocity occurred on this hypothetical traverse.

FIG. 3 illustrates typical reflection times on a conventional seismic reflection time section. Amplitude sections are difficult to illustrate and to interpret, so it is assumed that the seismologist has identified typical reflections and represented the time when these reflections were received as long dashed lines 121 through 125. In this figure all reflections are from plane surfaces. There is no dip on the reflection 121 at 0.1 second. Reflection 122 has a little dip and reflections 123 through 125 have progressively more dip. This is a simple case used to illustrate the effect of the low velocity zone in the next figure.

FIG. 4 illustrates the effect of the low velocity zone 101 from FIG. 1 on seismic times in FIG. 3. Long dashed lines 131 through 135 are the same as the corresponding lines 121 through 125 in FIG. 3 along the traverse from station 0.0 to 0.5 miles. The maximum shift occurs at station 1.0 mile where the LVZ 101 is the thickest. Lines 132 through 134 appear to have a structural high under station 0.5 miles such as at 136. If an isodepth display of the velocity data was not used, station 0.5 would be erroneously interpreted as a structural high along the traverse.

According to the present invention, velocity data derived from the reflection data would be used, as described later, to generate the isodepth display. This isodepth display would either be a transparency such as FIG. 1 or be projected on the conventional seismic section. The isodepth lines such as in FIG. 1, represent the times, along the traverse which would be obtained for a horizontal reflecting boundary at the indicated depth. Since these isodepth lines are superimposed on the conventional seismic section the times actual dips encountered in normal use can be compared with the times for horizontal reflecting boundaries as illustrated in FIG. 5.

Figure 5:
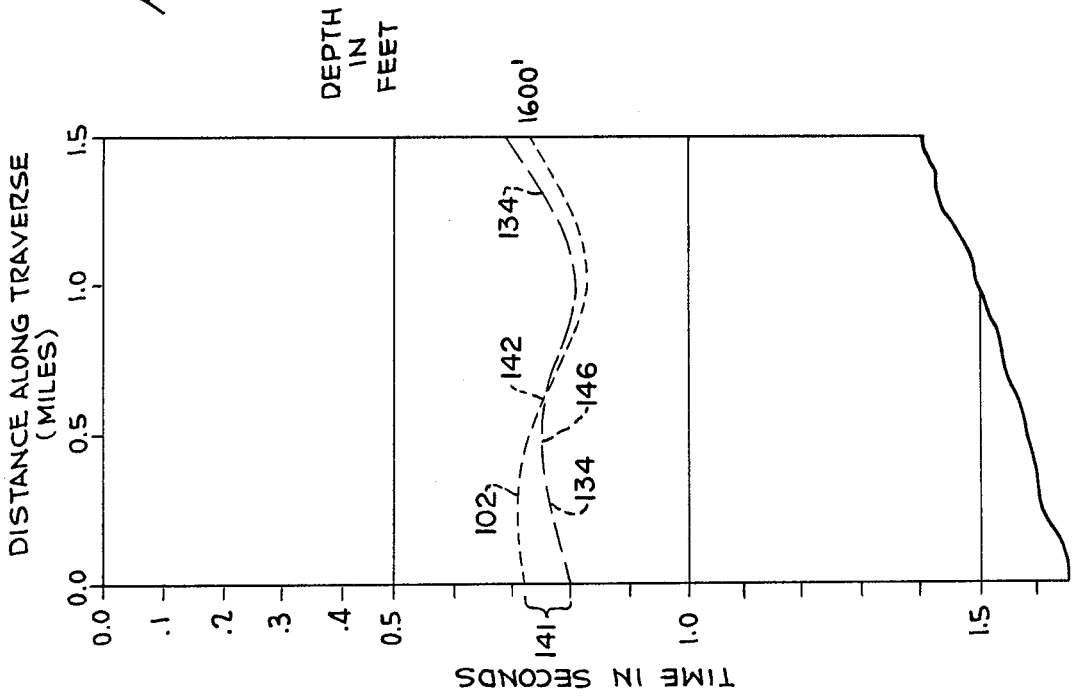
FIG. 5 illustrates the use of one isodepth line from FIG. 1 and one simulated seismic reflection from the time section in FIG. 4. The continuously dipping horizon is indicated by the progressive decrease in depth as compared with the 1,600 isodepth line.

FIG. 5 comprises line 102 from FIG. 1 and line 134 from FIG. 4 and illustrates a comparison of the actual reflection times 134 with times for a horizontal reflector 102 at a depth of 1,600 feet. Reflection 134 occurs at an appreciable later time 141 than horizontal reflector 102 at a depth of 1,600, hence actual reflector 134 is appreciable deeper than 1,600 feet under station 0.0 miles. The lines 102 and 134 get progressively closer together out to 142 where they cross one another. Hence reflector 134 is getting progressively shallower and at 142, it is 1,600 feet deep. Further to the right of crossover point 142, actual reflector 134 is progressively earlier in time than horizontal reflector 102. Thus 134 is progressively shallower in time and/or depth than 102. The curve 124 in FIG. 3 indicates the continuous dip to station 0.0 miles. However the line was shifted by the introduction of the low velocity zone 101 from FIG. 1 to make an apparent structural high at 136 in FIG. 4. The isodepth presentation shows that there is continuous dip toward station 0.0 miles, even at the minimum time 146. Hence the isodepth presentation superimposed on the conventional seismic reflection time section resolves the dip of actual reflectors and avoids the erroneous interpretation of structural highs where they do not exist.

The isodepth lines serve other useful functions such as determining the actual depth of any given reflector. It has been previously pointed out that reflector 134 was 1,600 feet deep at crossover point 142 in FIG. 5. If the reflector is midway between two isodepth lines, the depth of the reflector is approximately midway between the depth of these two isodepth lines. Further interpolation can be made. It is essential that the isodepth lines be spaced relatively close together so that the interval velocity is essentially a constant between adjacent isodepth lines.

The isodepth display also serves other useful purposes. The uniformly "drooping" isodepth lines in FIG. 1 from station 0.5 to station 1.5 miles indicates the low velocity zone 101 even though isodepth lines 103 and 104 might not be determined from the seismic data due to noise or insufficient data. Similarly the presence of reef 111 is indicated in FIG. 2 by the crowding together of the isodepth lines where the reef 111 exists and the uniform rise in all isodepth lines below the reef.

A very useful purpose of the isodepth display is to locate places where specific reflecting formations have different velocities. This can be done by following the crowding and separation of the isodepth lines at the same time as the reflections from the significant zones.

The preceding discussion has referred to isodepth displays used with conventional seismic reflection sections using a time scale. There is some desire in the art to convert the time scale on the section to a depth scale. This would be very interesting if the velocity calculations were infallible. A geologist thinks of the earth in terms of depth, not seismic reflection time. Anomalies due to velocity changes would be eliminated. If a seismic reflection depth scale is used, an iso-time overlay will serve as a check on the velocity actually used to convert the time scale of the section to a depth scale.

Figure 6:
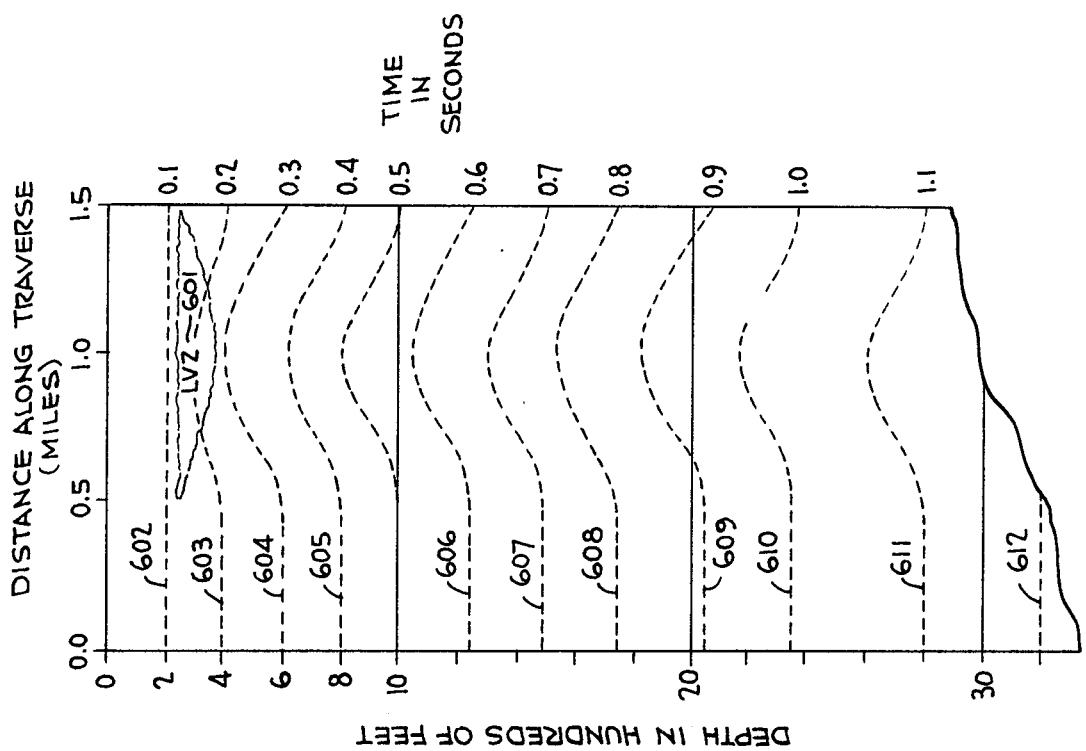
FIG. 6 illustrates the iso-time lines overlay or projection for a seismic reflection depth section. A low interval velocity is indicated by iso-time lines spaced closer together.

FIG. 6 illustrates an iso-time display to be used with a seismic reflection depth section. It is for the same field data as in FIG. 1 but the processed data has been converted to a depth scale. The depth scale on the left side of the display is the same as the depth section scales in FIGS. 1 and 2 down to 1,000 feet deep and is a linear function of depth. The dotted lines are iso-time lines for each tenth of a second. Since the velocity along the traverse is a constant down to 0.1 seconds, the iso-time line 602 is horizontal and the depth is 200 feet. The iso-time line 603 for 0.2 second is horizontal from station 0.0 mile out to 0.5 mile but then deflects upward to a maximum under station 1.0 mile and then curves back downward. The iso-time line 602 for 0.3 second is similar to iso-time line 603 but has more deflection due to the inclusion of a greater thickness in LVZ 601. Other iso-times 605 through 611 have a curvature similar to iso-time line 604. The iso-time lines 606 through 612 are progressively spaced farther apart due to the increase of velocity as a function of depth. The greater the interval velocity, the farther the iso-time lines are separated. The deflection of the iso-time lines in FIG. 6 is in the opposite direction to the isodepth lines in FIG. 1. Crowding of iso-time lines indicates a low interval velocity in LVZ 601 in FIG. 6 while wider spacing of the isodepth lines indicates a low velocity zone LVZ 101 in FIG. 1.

The iso-time display can be used to evaluate the velocity distribution used to convert the seismic data as received in time to a depth section. If the iso-time lines fit the curvature of a reflection near it, it is quite possible that the velocity distribution is erroneous. The iso-time lines can be used to determine the time of a reflection from the depth section in a similar manner to the use of the isodepth lines.

Iso-time lines are spaced in relations to the depth scale. These lines are preferably every 10 milliseconds for a large scale seismic section. The 100 millisecond (0.1 second) lines illustrated were selected for simplification of the illustration. The lines are preferably colored different than the section on which they are to be used. Specified lines are usually heavier such as every fifth or tenth line.

To those skilled in the art, it is obvious that the preferred embodiment of the invention is a totally automated set of machine instructions. Such would be this case of an nonhuman intervening computer programs.

FIG. 7 illustrates one procedure to prepare the displays previously described. Seismic data is digitally recorded in the field on a reel of magnetic tape. This reel is sent to the data processing center and placed on magnetic tape transport 701. The data from one seismic record is fed into the computer and reformatted in the conventional manner as indicated as 702. Data from a common reflection point, CRP, but having different source-to-detector distances are stored at 703 in such a manner that it can be retrieved by the computer. The velocities are automatically computed in 704 using the previously cited method of Hollingsworth. The data from a CRP, recorded using a plurality of source-to-detector distances, are crosscorrelated to determine the moveouts observed for each source-to-detector distance. These normal moveouts, NMO, are fed into 705 and applied to the data from 703. The time shifted data from a CRP is fed into 708 where it is summed. The summed data from 708 is further processed in 709 and a conventional seismic reflection time section 710 is made in the normal manner.

The NMO determined in 704 is then used in the computer to determine the average velocity to each reflecting horizon. These velocities are fed into section 706 in the computer which prepares a table of reflection times for each specified depth interval based on the equation, the velocity multiplied by the time equals distance. Plotter 707 plots the tabular data from 706 on a transparency using the same time and horizontal distance scales as plotter 710.

Instead of the automatic analysis program of Hollingsworth in 704, any source seismic velocities may be used. In certain areas, a series of continuous velocity surveys have been made in deep wells. Since these surveys furnish the actual measured velocity, they can be used for the velocity. In this case, a linear interpolation or smoothing is used between the wells.

In certain cases, velocities of noises may be used rather than signal velocities. In this manner the suspected noises may be identified and the events enhanced on the seismic section. This can be applied to multiple reflections by using the velocity not only down to the reflector causing the multiples, but also the same velocity can be used to process the remaining recorded data.

In other cases, the value of the velocity used for processing the data in 705 is the best value of the velocity as determined from the data in 704 using the method of Hollingsworth. Then two or more isodepth or iso-time displays would be made in 706 and 707. One display would be made using the velocity down to the horizon causing multiple reflections and the same velocity for all deeper depths. This display would be used to identify residual multiple reflections on the conventional section designed and processed to attenuate multiple reflections. The second display from 707 would be based on the velocities to the desired reflecting media. Other displays from 707 could be based on velocities to other sources of multiple reflections.

The overlays representative of interval velocities previously described had precisely the same horizontal and vertical scales as the conventional seismic reflection section. An alternative method would be to have the same relative horizontal and vertical scales. In this manner, the overlay could be optically projected onto the seismic reflection section with suitable optical magnification (or reduction) so that coincidence is obtained. While the term overlay has been used, it is intended to mean the isodepth section or iso-time section is superimposed on the conventional seismic reflection section as a transparency or as a projection. A suitable projection could be used for a transparent film or for an opaque sheet. It is preferred that only the lines such as illustrated in FIG. 1 be superimposed on the section proper. Colored lines are preferred since they can be visually identified.

Having thus described the invention, what is claimed as new and novel to be secured by Letters Patent is:

1. A method of preparing seismic reflection sections to include velocity information comprising the steps of:
    1. processing seismic signals within an automated data processing machine,
    2. plotting said seismic signals within a seismic section plotter to form seismic reflection sections in accordance with the processed seismic signals in step (1),
    3. determining interval velocity information relating to said seismic signals within an automated data processing machine,
    4. plotting within a seismic section plotter an overlay representative of said interval velocities and having the same relative horizontal and vertical scales as said seismic reflection sections, and
    5. superimposing said overlay onto said seismic reflection sections.

2. The method of claim 1 wherein said overlay comprises an isodepth display.

3. The method of claim 1 wherein said overlay comprises an iso-time display.

4. The method of claim 1 wherein said overlay in step (4) is a different color than said seismic reflection sections.

5. The method of claim 1 wherein steps (3), (4), and (5) are repeated a plurality of times for different velocity functions.

6. The method of claim 1 wherein said overlay in step (4) has the same horizontal and vertical scales as the conventional seismic reflection section.

7. The method of claim 1 wherein step (5) comprises the projecting of said overlay onto said conventional seismic reflection section.

* * * * *